(No Model.)
W. G. MITCHELL.
CAR AXLE LUBRICATOR.
No. 297,527. Patented Apr. 22, 1884.
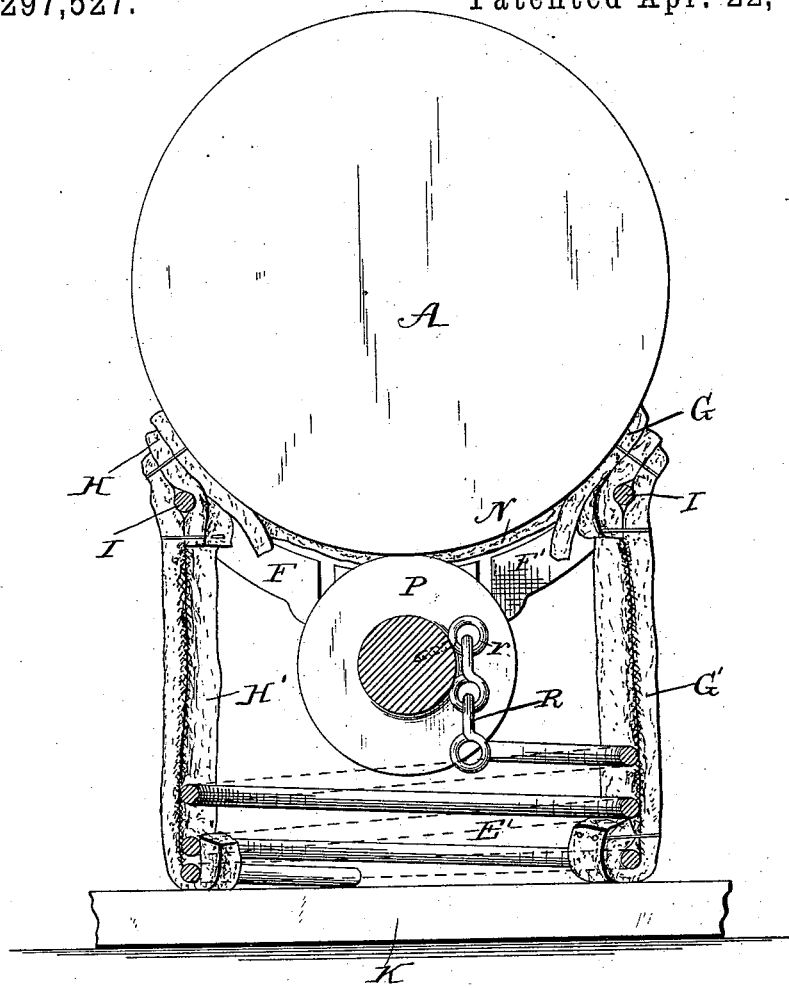

UNITED STATES PATENT OFFICE.

WILLIAM GEORGE MITCHELL, OF BROOKLYN, NEW YORK.

CAR-AXLE LUBRICATOR.

SPECIFICATION forming part of Letters Patent No. 297,527, dated April 22, 1884.

Application filed February 20, 1884. (No model.)

*To all whom it may concern:*

Be it known that I, WILLIAM G. MITCHELL, a citizen of the United States, residing at Brooklyn, in the county of Kings and State of New York, have invented certain new and useful Improvements in Car-Axle Lubricators, of which the following is a specification, reference being had therein to the accompanying drawing.

This invention consists in an improved car-axle lubricator, which I make and use, substantially as set forth hereinafter, and as shown in the accompanying drawing, in which the figure is a cross-section of the apparatus.

This invention relates to lubricators for car-axle and other journals; and it consists in a rotary beater attached to a roller or spool to break or disintegrate and throw or carry up oil or other lubricant onto the journal, and in the combination thereof to operate with the other parts hereinafter recited in an ordinary or suitable axle-box.

The roller P is made spool-like in form, with its central portion concaved or cut away spool-like, and has a chain, R, fastened to it at the small central part, so as to be carried around with it, with one portion free, so as to act as a beater, or "flagel," as it is termed. The chain R, of metal or other suitable material, is made of two or other number of links or parts of metal or other suitable material jointed or connected to form a flexible chain, beater, or flagel. The roller P is formed of wood or other material, and has journals on its ends set into notches or bearings in frame F, so as to be held up against the under side of the journal A, so as to turn with the journal and carry the chain around against the lubricant below and the journal above. The frame F is formed of end and side parts having a suitable spring-base attached to support it, and has bearings for the journals of roller P, and bars I I to bear the wipers G H and their dependent aprons and the collar N. The wipers G H are held up by the frame F, and rest against the sides of the journal. They are formed of felt or other suitable material, and are held against the journal with a suitable spring-pressure, so as to spread the oil or lubricant evenly over the surface of the journal, and to wipe off the superabundant lubricant which may be applied thereto, to avoid wasting it, as well as to clean the journal from worn lubricant and wearings and other matter. The wipers have descending parts G' H', which dip into the oil or lubricant below to draw it up wick-like to avoid getting dry, and to remedy any failure of the other parts to apply lubricant. These act as inclosing-shields to catch and prevent lubricants from being thrown out or wasted. They also serve to strain the oil or lubricant and to remove and hold dust or other substances from it. The collar part N extends between wipers G H, under the journal, to hold the lubricant and restrain it from wasting along the axle. As the journal turns either way, it turns roller P, and rotates the chain or beater R, so as to disintegrate and throw or carry up the lubricant to the journal. The wipers and collar wipe the journal with an elastic pressure, to take off the worn matter and spread the lubricant evenly over it. The aprons G H keep the lubricant from wasting, and all the parts are held up to their work by the frame F and its spring-base, of any suitable construction. Oil or any other suitable lubricant is used. By means of this heavy durable chain beater or flagelant R we are enabled to use thick grease or stiff oil in the winter, or other lubricant which could not be very suitably used previously, and the wipers, acting in combination therewith, spread such lubricant over the journal, so as to make it suitable, where otherwise the action would be imperfect.

The parts are made very durable, so as to last and keep in order for a long time; but they may be quickly removed and replaced with others, or repaired and replaced.

Various modifications of the parts and arrangement may be made and used.

I claim—

1. In a journal-lubricator, a roller or spool provided with a chain or jointed beater, R, attached, to rotate with it as a beater.

2. In a journal-lubricator, a roller or spool provided with a metal chain, R, attached thereto at one point, as shown.

3. In a journal-lubricator, a roller or spool provided with a chain or jointed beater, R, combined with wipers G H, and with a spring-supporting frame.

In testimony whereof I affix my signature in the presence of two witnesses.

WILLIAM GEORGE MITCHELL.

Witnesses:
WALTER DELVALLE,
W. H. CLOUGH.